United States Patent [19]

McCartney

[11] 4,455,586

[45] Jun. 19, 1984

[54] HIGH VOLTAGE FILTERING AND PROTECTION CIRCUIT

[75] Inventor: Thomas McCartney, Deerfield, Ill.

[73] Assignee: ONEAC Corporation, Bannockburn, Ill.

[21] Appl. No.: 368,513

[22] Filed: Apr. 15, 1982

Related U.S. Application Data

[63] Continuation-in-part of Ser. No. 200,432, Oct. 24, 1980, abandoned.

[51] Int. Cl.³ .............................................. H02H 3/20
[52] U.S. Cl. ........................................ 361/56; 361/91; 361/111; 361/120
[58] Field of Search .................................. 361/15–17, 361/54, 56, 90, 91, 110, 111, 112, 126, 127, 129, 117–120; 307/318, 566, 559

[56] References Cited

U.S. PATENT DOCUMENTS

| | | | |
|---|---|---|---|
| 3,041,501 | 6/1962 | Willits | 361/434 X |
| 3,372,285 | 3/1968 | Blazek et al. | 361/111 X |
| 3,558,830 | 1/1971 | Bender | 361/56 X |
| 3,894,274 | 7/1975 | Rosenberry, Jr. | 361/56 X |
| 4,385,338 | 5/1983 | Hasse et al. | 361/130 |

FOREIGN PATENT DOCUMENTS

| | | | |
|---|---|---|---|
| 1248103 | 8/1967 | Fed. Rep. of Germany | 307/318 |
| 1809438 | 6/1970 | Fed. Rep. of Germany | 361/56 |
| 2259530 | 6/1973 | Fed. Rep. of Germany | 361/56 |
| 1175318 | 3/1959 | France | 361/128 |
| 563678 | 6/1975 | Switzerland | 361/91 |
| 1037958 | 8/1966 | United Kingdom | 361/119 |
| 1310354 | 3/1973 | United Kingdom | 323/231 |
| 504270 | 4/1976 | U.S.S.R. | 361/56 |

OTHER PUBLICATIONS

"The Inert Gas Filled Surge Voltage Protector", Components Report XIII (1978), pp. 29 to 34, Schmid.

Primary Examiner—Harry E. Moose, Jr.
Attorney, Agent, or Firm—Mason, Kolehmainen, Rathburn & Wyss

[57] ABSTRACT

A high voltage filtering and protection circuit that is particularly useful in multilead distribution systems, that include a live, a neutral and a ground line. Transient voltage suppressors are connected from a common node to each of the lines. The suppressors are advantageously silicon diode transient voltage suppressors suitable for high voltage applications, clamping at a rated voltage in one direction and having a forward diode characteristic in the other direction. Each suppressor may be paired with a parallel filter capacitor protected by its diode from surges or transient voltages. The paired suppressors and parallel filter capacitor where polarized capacitors are utilized provides an AC equivalent capacitor. In one arrangement, a gas discharge tube is provided in series with the suppressor that is connected from the common node to the ground line. In another arrangement with or without the gas discharge tube, the suppressors are bidirectional devices with a rated clamping voltage equal to less than the peak line voltage and a predetermined amount greater than one-half of the peak line voltage.

6 Claims, 5 Drawing Figures

HIGH VOLTAGE FILTERING AND PROTECTION CIRCUIT

CROSS REFERENCE TO RELATED APPLICATIONS

This application is a continuation-in-part of application Ser. No. 200,432 filed on Oct. 24, 1980 and now abandoned.

BACKGROUND OF THE INVENTION

1. Field of the Invention

This invention relates generally to circuits for AC power line protection and filtering and more particularly to such circuits using protected capacitors.

2. Background of the Invention

In the past transient voltage suppressors have been connected across multilead AC lines with each suppressor connected between each pair of lines. As a result when a breaker is positioned in only one of those lines, normally the live line, the failure of a suppressor not connected directly to the fused line does not activate the breaker.

Further, many line filters prove to be unreliable because capacitors connected across the suppressor are subjected to large transient voltages causing failure of the capacitor.

Further, in applications where AC capacitors are required, polarized capacitors have not been found suitable because they are not designed to operate under reverse voltage conditions without experiencing failure.

The present invention not only provides an improved line protection and filtering circuit arrangement but enables polarized capacitors to be used in high voltage alternating current applications.

SUMMARY OF THE INVENTION

It is an object of this invention to provide an improved filtering and protection circuit.

It is another object of the present invention to provide such a circuit using solid state diode elements capable of withstanding a high voltage environment and useful to suppress transient voltages and to protect against voltage surges.

It is also an object of the present invention to provide fault protection using a single breaker for line, neutral, and ground leads that is activated in response to a fault between any of those leads.

It is a further object of the present invention to provide the use of polarized capacitors in AC circuits.

It is another object of the present invention to provide a protection circuit wherein filter capacitors are protected from voltage transients and surges.

These and other objects of the present invention are achieved by a power line protection circuit for connection between a live lead, a neutral lead and a ground lead. The circuit includes a breaker intended to be located in only the live lead. At least three transient voltage suppressors are connected from a common node on one end to each of the leads so that when any of the suppressors fail the breaker will be activated.

Still other advantages are achieved by a polarized capacitive device useful to replace non-polarized alternating current capacitors. The device includes a pair of polarized capacitors and a pair of diodes. One capacitor and one diode are connected to bypass the half cycle of the voltage across the device and the other capacitor and diode are connected to bypass the negative half cycle of the voltage across the device.

In one arrangement, a gas discharge tube is provided in series with the suppressor that is connected from the common node to the ground line. In another arrangement with or without the gas discharge tube, the suppressors are bidirectional devices with a rated clamping voltage equal to less than the peak line voltage and a predetermined amount greater than one-half of the peak line voltage.

BRIEF DESCRIPTION OF THE DRAWING

These and other objects and advantages of the present invention will become more apparent by reference to the following description taken in conjunction with the accompanying drawing wherein.

DESCRIPTION OF THE PREFERRED EMBODIMENT

Figure 1:
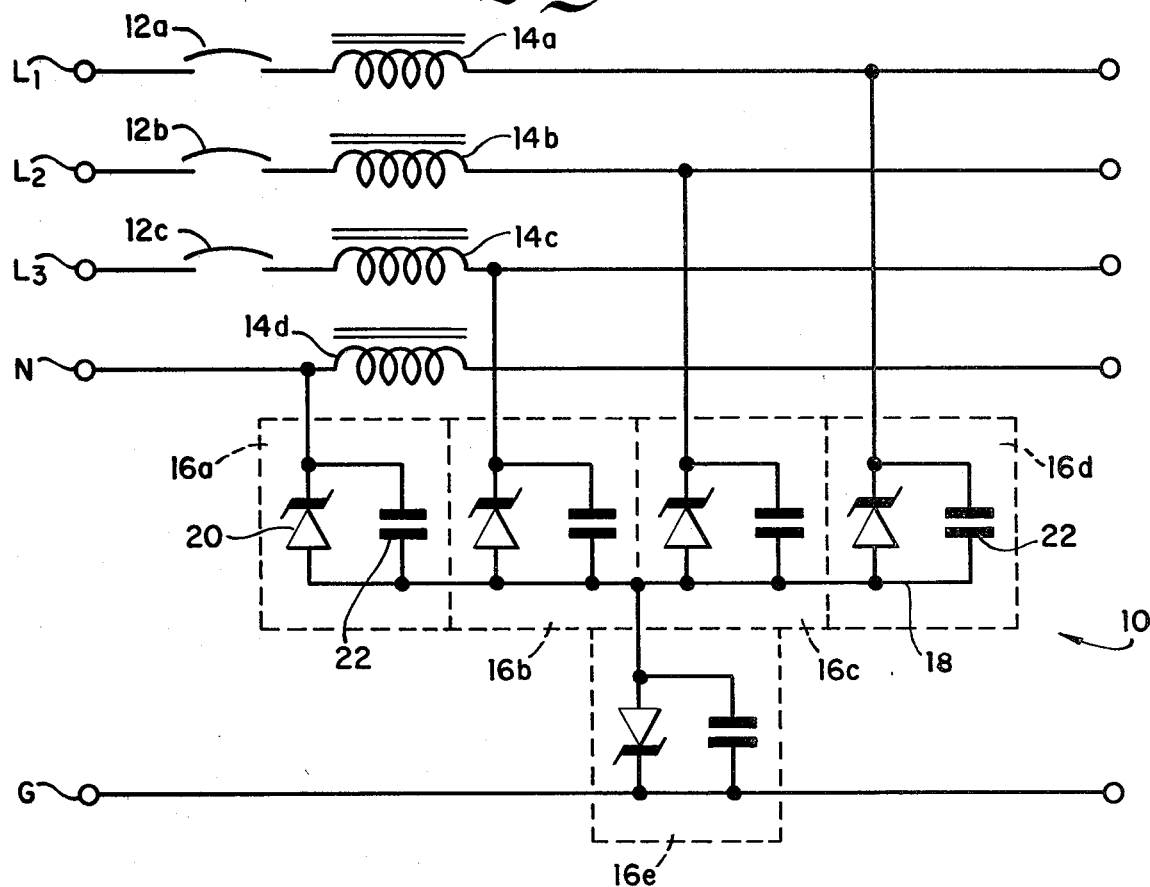
FIG. 1 is a circuit schematic showing one embodiment of the protection circuit of the present invention.

Referring to the drawing wherein like reference characters are used for like parts throughout, there is illustrated in FIG. 1 a three phase power line with live lines L1 through L3, neutral line N, and ground line G. Connected across these various lines is a power line filtering and protection circuit 10. Each of the live lines L1 through L3 includes a conventional breaker 12a, 12b or 12c but the neutral and ground lines do not include such a breaker. In addition, inductors 14a, 14b, 14c and 14d are serially respectively located in the live lines L1, L2 and L3 and on neutral line N between the AC source (not shown) and the circuit 10. Of course, it should be understood that in a specific embodiment the inductors 14a, 14b, 14c, and 14d are omitted.

A filtering and protection circuit 10 includes a plurality of filtering and protection devices 16a through 16e enclosed in dotted lines in FIG. 1. The devices 16 are connected in a wye arrangement between a common node 18, indicated by a line in FIG. 1, and the live lines L1 through L3, the neutral line N and the ground line G. With this arrangement even if a fault occurs in any of the devices 16a through 16e wherein the device fails short, a breaker 12 connected in one of the live lines will be activated since each of these devices is connected by way of common node 18 to one of the live lines including a breaker 12.

Each device 16 includes a transient voltage suppressor 20 and in specific embodiments a parallel capacitor 22. The transient voltage suppressors 20 are preferably silicon p-n junction devices rated for high voltage and current applications. The current-voltage characteristic of each of the suppressors 20 is preferably similar to that of zener diodes, clamping at a given rated voltage in one direction and having a forward diode characteristic in the other direction. Suitable transient voltage suppressors are distributed by TRW, 301 West O Street, Ogallala, Nebr. with identifying numbers TVP1500 through TVP1534. Since the clamping time from zero volts to the breakdown voltage is on the order of a nanosecond the response of these devices is essentially instantaneous. These suppressors are available with clamping voltages higher than normal line voltages. Each suppressor 20 is arranged to permit forward current flow from the common node 18 into a line L1 through L3, a neutral N or a ground G while allowing reverse current flow only when a clamping voltage is exceeded. While the transient voltage suppressors 20 are shown in FIG. 1 with the anodes of each suppressor 20 being connected to the common node 18, it should be realized that the suppressors 20 can be connected in the reverse sense with the cathodes of each suppressor 20 being connected to the common node 18.

A suppressor 20 can also be combined with a parallel surge suppressor (not shown). For example, a shunt diode with a high forward surge rating increases the forward surge rating of the combination by shunting high node to line currents across the suppressor 20. If the clamping voltage of the suppressor is less than the breakdown voltage of the shunt diode the other shunt diode characteristics are not critical. Similarly a bi-directional clamp or protection device, such as a gas discharge tube, a metal oxide varistor, a bi-directional voltage transient suppressor or a combination of such devices can be shunted across the suppressor 20 for surge protection. As still another alternative embodiment a bi-directional transient voltage suppressor made up of back to back p-n junction silicon devices, such as those described above can be utilized.

The capacitors 22 are protected due to the ability of the suppressors 20, to quickly conduct to shunt the capacitor 22 in response to a surge or transient.

In other specific embodiments it should be realized that the wye arrangement of the protective devices 16 is suitable for single phase operation as well as other line arrangements.

In accordance with important aspects of the present invention, the capacitors 22 in a specific embodiment are polarized capacitors such as electrolytic. The polarized capacitors are connected with the positive terminal connected to the cathode of a respective suppressor 20. In this way, the polarized capacitors are capable of safe operation in an AC circuit without experiencing reverse voltages that could result in failure of the capacitor 22.

Figure 2:
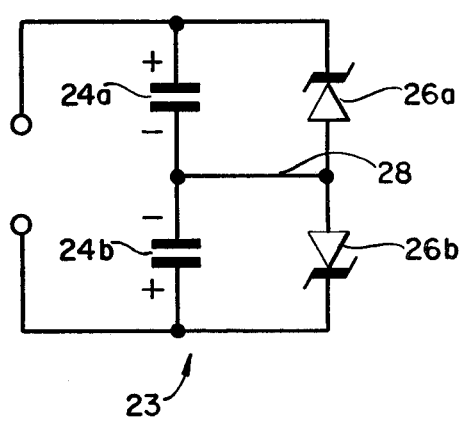
FIG. 2 is a circuit schematic of an embodiment of the AC equivalent capacitor of the present invention.

Referring now to FIG. 2, an AC equivalent capacitor network 23 results from the parallel arrangement in FIG. 1 of the capacitors 22 and the suppressors 20. The AC equivalent capacitor network 23 of FIG. 2 includes a pair of diodes 26a, 26b connected in series anode to anode. A polarized capacitor 24a is connected across diode 26a with the positive terminal of the capacitor 24a connected to the cathode of the diode 26a. Similarly, a polarized capacitor 24b is connected across the diode 26b with the positive terminal of the capacitor 24b connected to the cathode of the diode 26b.

The capacitor 24a on one side of the network and the diode 26b on the other side of the network form one diode clamper and the diode 26a together with the capacitor 24b form another diode clamper. The two diode clamper circuits are connected together at common node 28 with each diode 26 shunting current flow from common node 28 around their parallel capacitors 24 and preventing reverse voltages across either capacitor 24. The steady state voltage across the diode 26 of each clamper is therefore the difference between the voltage across the filter 23 and the voltage across clamper's capacitor. Thus the voltage across each diode 26 is a non-zero crossing sinusoid, one positive and one negative. Thus each polarized electrolytic capacitor 24 is capable of acting in a high energy alternating current environment without experiencing a reverse voltage.

Conveniently a very large resistance (not shown) can be connected across the filter 23 so that the charge trapped on the capacitors 24 will eventually bleed off after a long period of non-use. Such a resistance draws negligible current and does not alter the characteristics of the circuit.

The diodes 26a and 26b can be any suitably rated p-n junction device including a conventional diode or a zener diode but in order to avoid overvoltage of the capacitors silicon transient voltage suppressors, such as the silicon transient suppressor discussed above, commercially distributed by TRW, are preferred. The forward diode current of the diodes 26 is essentially zero and the reverse breakdown voltage or the clamp voltage in the case of transient suppressors should be greater than the peak applied voltage but less than the breakdown voltage of the capacitors 24.

In an alternative embodiment (not shown) the polarity of the capacitors 24 and diodes 26 can be reversed. The circuit operation is otherwise identical to that shown in FIG. 2 and described above.

Figure 3:
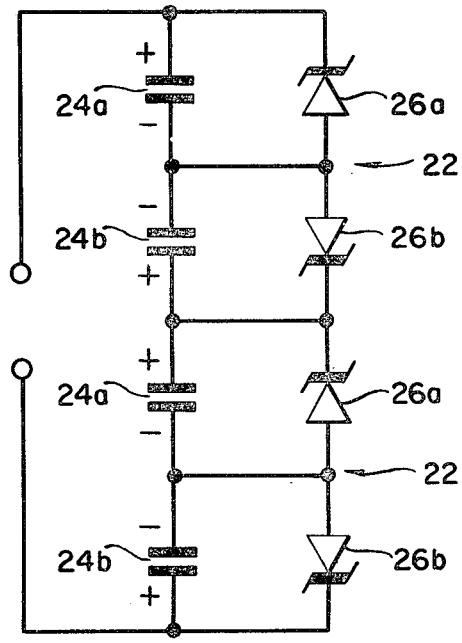
FIG. 3 is a circuit schematic showing an alternate embodiment for the circuit shown in FIG. 2.

The filters 23 shown in FIG. 2 or the alternative embodiment just described can be stacked as shown in FIG. 3 to increase the voltage capability of the overall device or to reduce the required ripple current rating of each unit. The filters 23 can be stacked to form a ladder network of any desired length with the polarity of the capacitors 24 and the diodes 26 alternating.

Figure 4:
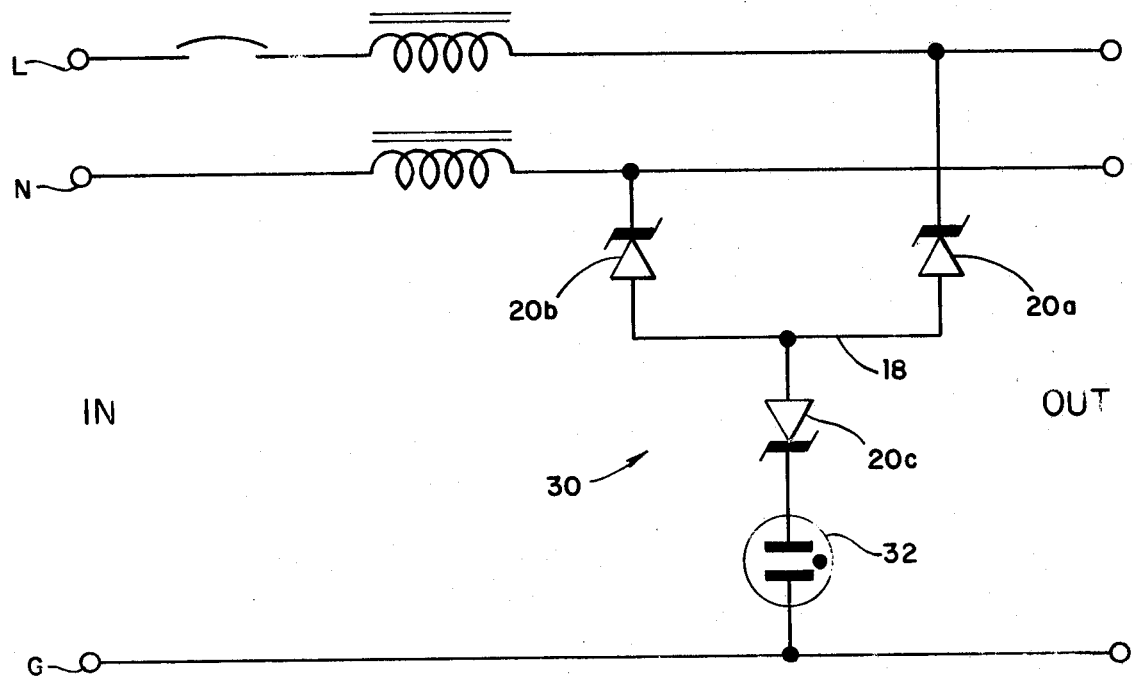
FIG. 4 is a circuit schematic of another embodiment of the present invention utilizing a gas discharge tube.

Considering now another embodiment of the present invention and referring now to FIG. 4, the protection circuit 30 includes a gas discharge tube 32 or similar device that is connected in series with the suppressor 20c provided between the common node 18 and the ground line G. With this arrangement, the suppressors 20a and 20b clamp normal mode transients appearing between the live line L and the neutral line N while the suppressor 20c and the gas discharge tube 32 clamp common mode transients such as transients that appear across both the live line L and the neutral line N with respect to the ground line G.

Further, the gas tube 32 provides a very high impedance to the ground line G. The high impedance to ground is an important consideration to satisfy existing safety standards as currently defined. When a high voltage transient is present, the gas discharge tube 32 is immediately extinguished when the transient falls below a level approximately equal to the peak line voltage due to the clamp voltage ratings of the suppressor 20c and either the suppressor 20a or 20b. Accordingly, in contrast to conventional gas discharge tube protection circuits, the gas discharge tube 32 does not remain conductive until the next zero crossing of the AC line voltage and therefore avoids discontinuities in the output waveform and the possibility of activating the line circuit breaker.

Figure 5:
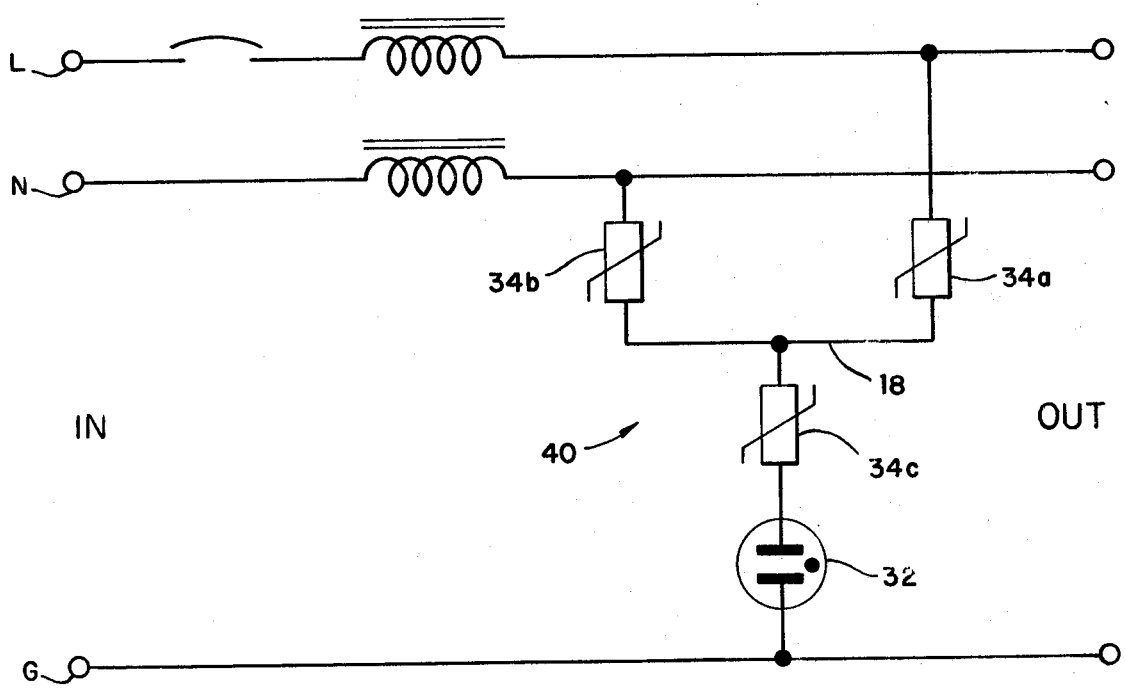
FIG. 5 is a circuit schematic of yet another embodiment of the present invention.

Referring now to FIG. 5 and considering other aspects of the present invention, the protection circuit 40 includes transient voltage suppressors 34a, 34b, and 34c and a gas discharge tube 32 connected in series with the suppressor 34c. The transient voltage suppressors 34a, 34b, and 34c are bi-directional suppressor devices such as varistors as discussed hereinbefore in connection with an alternative embodiment of FIG. 1. In addition to varistors, another specific type of suitable bi-directional transient voltage suppressor is available from General Semiconductor Industries, Inc. sold under the Trademark TRANSZORB as device types 1.5KE7.5C through 1.5KE400C.

The protection circuit 40 provides the same degree of transient protection as the protection circuit of FIG. 4 and additionally allows the utilization of bi-directional suppressors 34a, 34b, and 34c that have a rated bi-directional clamp voltage that is one-half the rating of the devices 20a, 20b, and 20c of FIG. 4. For example, the voltage rating of the suppressors 34a, 34b, and 34c is less than the peak line voltage and a predetermined amount greater than one-half of the peak line voltage. Thus, in a specific application for 120 VAC line operation, a clamp voltage rating of 100 to 110 volts for each of the suppressors is suitable. Further, and as discussed hereinbefore, the bi-directional transient suppressor devices 34a, 34b, and 34c are suitable for use without the gas discharge tube 32 in the circuit of FIG. 1 in place of the suppressors 20.

Many modifications and variations of the present invention are possible in light of the above teaching. Thus, it is to be understood that, within the scope of the appended claims, the invention may be practiced otherwise than as specifically described above.

What is claimed and desired to be secured by Letters Patent of the United States is:

1. A protection circuit for an AC system having a live conductor, a neutral conductor, a ground conductor, and a breaker connected in either the neutral or live conductor characterized by the provision of at least three transient protection devices and a gas discharge tube, a first of said transient protection devices being connected between a common node and said neutral conductor, a second of said transient protection devices being connected between said common node and said live conductor, said third transient protection device and said gas discharge tube being connected in series between said common node and said ground conductor, each of said transient protection devices having bi-directional clamping characteristics for conduction in each direction when the voltage across said transient protection devices exceeds a predetermined voltage.

2. The protection circuit of claim 1 further comprising a first capacitor being connected across the series combination of said third transient protection device and said gas discharge tube, a second capacitor being connected across said second transient protection device and a third capacitor being connected across said first transient protection device.

3. The protection circuit of claim 1 wherein said AC system provides a nominal AC line voltage between the line and neutral conductors, said predetermined voltage being less than the peak value of said AC line voltage and a predetermined amount greater than one-half of the peak value of said AC line voltage.

4. A protection circuit for an AC system having a live conductor, a neutral conductor, a ground conductor, and a breaker connected in either the neutral or live conductor characterized by the provision of at least three transient protection devices and a gas discharge tube, a first of said transient protection devices being connected between a common node and said neutral conductor, a second of said transient protection devices being connected between said common node and said live conductor, said third transient protection device and said gas discharge tube being connected in series between said common node and said ground conductor, each of said transient protection devices having a forward diode characteristic and being connected to provide said forward diode characteristic to current in a first direction between said node and said respective conductor and clamping at a voltage above the line voltage in the other direction.

5. The protection circuit of claim 4 further comprising a capacitor connected in parallel across each of said transient protection devices.

6. The protection circuit of claim 5 wherein said capacitors are polarized capacitors each of said transient protection devices including a cathode lead and an anode lead, each of said polarized capacitors having a positive terminal connected to the cathode of said respective transient protection device.

* * * * *